Sept. 19, 1944.  M. L. BENJAMIN ET AL  2,358,300

PRECISION CHUCK

Filed Nov. 23, 1942

INVENTORS
MILTON L. BENJAMIN and
CHARLES E. DREW
BY
Oberlin, Limbach & Day.
ATTORNEYS Patented Sept. 19, 1944

2,358,300

UNITED STATES PATENT OFFICE 2,358,300

PRECISION CHUCK

Milton L. Benjamin, Cleveland, and Charles E. Drew, Willoughby-on-the-Lake, Ohio; said Drew assignor to said Benjamin Application November 23, 1942, Serial No. 466,594

2 Claims. (Cl. 279—49)

This invention relates to a chuck for gripping and holding a bar-shaped tool, a drill shank, a stock bar or the like in precise and accurate alignment with the axis of the chuck. Our invention is particularly adapted to a chuck of the type in which the gripping action is derived from the combined relative longitudinal movement of pressure exerting parts (such as a nose-piece threaded upon a shank) and a wedging action between such parts and the tool gripping member proper, such as a collet or chuck jaws. Our invention is well adapted to a collet chuck, such as that shown in U. S. Patent No. 2,228,685 issued January 14, 1941 to M. L. Benjamin.

We have ascertained that regardless of the degree of accuracy with which the component parts of a tool chuck might be made and assembled, that there is still a possibility of even a slight cocking of these parts as they move into gripping position, with the result that such a minor inaccuracy will be magnified many fold at the outer end or tip of the tool which is held in the chuck. Where screw threads are employed as the medium for producing relative movement and gripping force between the moving parts of the chuck, it is a practical impossibility to eliminate manufacturing errors, simply because it is not possible to manufacture a perfect screw thread.

It is, therefore, the general object and nature of our present invention to provide a chuck structure in which the tool is gripped in accurate, precision alignment with the axis of the chuck, regardless of any misalignment or manufacturing errors in the component operating parts of the chuck itself.

A further object of the invention is to provide means for so transmitting the gripping pressure of the relatively longitudinally movable parts of the chuck that such pressure will be exerted uniformly, and in a straight line coinciding with the axis of the chuck, even through such moving parts (e. g. the nose-piece and shank) might themselves be improperly aligned or cocked.

A further object of the invention is to provide a construction embodying the above novel and beneficial advantages, and which, in addition, lends itself to relatively simplified and inexpensive methods of manufacture.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1:
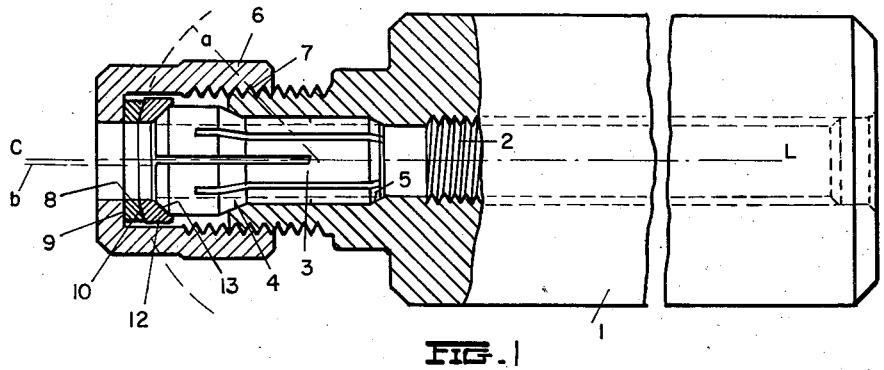
Fig. 1 is a longitudinal, sectional view of a chuck embodying the principle of our invention.
Figure 2:
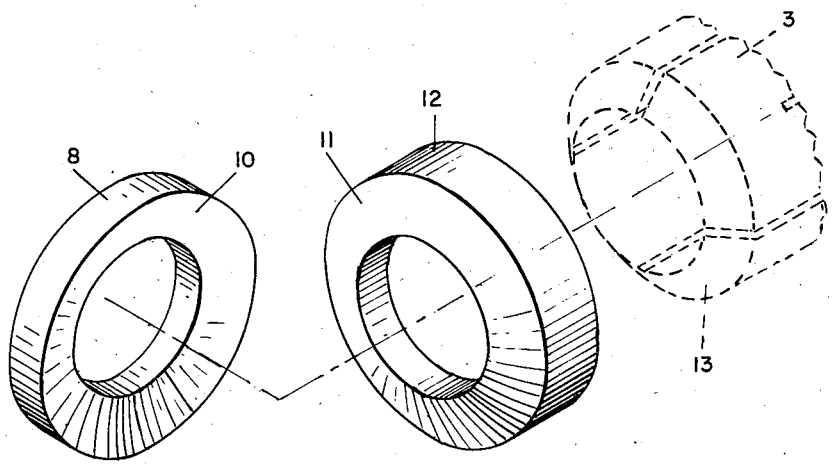
Fig. 2 is an enlarged, disassembled perspective view of the bearing rings embodying the characteristic essential of our invention.

Now referring more particularly to the drawing, there is shown therein a chuck comprising a shank 1 adapted to be mounted upon a drive shaft or an arbor in any suitable manner such as by the internal thread 2. A longitudinally slotted collet 3 fits within the inner bore of the shank 1 and has the cam surfaces 4 and 5 which seat upon corresponding complementary surfaces in the shank, whereby, upon exertion of longitudinal, axial pressure upon the collet 3, the latter is caused to contract radially and thus produce the desired gripping action upon the tool or bar held in the chuck.

The nose-piece 6 threadably engages the shank 1 through the medium of the screw threads indicated at 7. A nose-piece bearing ring 8 engages with the inner, flat radial surface of the nose-piece 6, as indicated at 9. The nose-piece bearing ring 8 thus is floating or makes a sliding engagement with the nose-piece 6.

The right-hand or inner side face of the nose-piece bearing ring 8 is in the form of a spherical surface 10 which fits against a similarly shaped spherical surface 11 on the outer or left-hand side of the collet bearing ring 12. The right-hand or inner face of the collet bearing ring 12 forms a conical bearing surface or seat for the conical cam surface 13 on the left-hand or outer end of the collet 3.

The spherical bearing surfaces 10 and 11 coincide with a sphere (as indicated by the dotted curved line in Fig. 1) having the radius $a$, and whose center coincides with the axial center line C—L of the chuck. It will thus be seen, that even though the nose-piece 6 might occupy an improper axially aligned position wherein its own axial center line does not coincide with the line C—L of the chuck shank 1, such as, for example, a position as indicated by the dotted line $b$, that the pressure transmitted from the nose-piece 6 to the collet 3 will still be in a straight line direction coincident with the axis of the chuck shank 1 and uniformly transmitted to the collet bearing 13 all around its circumferential extent. As long as the pressure exerted by relative movement of the nose-piece 6 upon the shank 1 and transmitted to the collet 3 is in such an axially coincident direction and so transmitted to the collet 3, the latter, and the tool or bar which it grips, will not itself be forced, strained or disturbed from properly aligned position.

Figure 3:
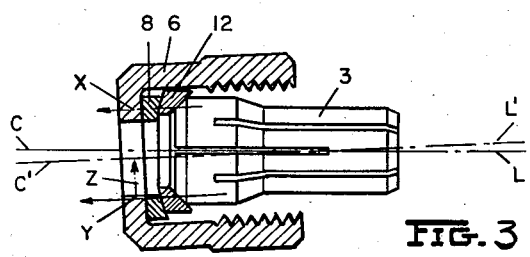
Fig. 3 is an abbreviated, sectional view of the nose-piece bearing rings and collet, illustrating the operation of our invention in correcting nose-piece "cocking."

As illustrated in Fig. 3, our invention is also capable of eliminating errors due to "cocking" of the nose-piece, and coincidentally, exerting a resultant force tending to move the nose-piece to "uncocked" position.

In Fig. 3, the nose-piece 6 is shown in a cocked position wherein its center line C'L' is at an angle with the center line C—L of the collet 3 and chuck shank 1. In the drawing, this angle has, of course, been slightly exaggerated for the sake of illustration. As the nose-piece 6 is tightened upon the shank 1, a counter-reaction to this tightening force is exerted through the bearing rings 8 and 12, substantially as indicated by the force-line arrows X and Y. The length of the arrows X and Y in an indication of the relative magnitude of these reaction forces. These forces X and Y may be resolved into a resultant force producing the couple Z which tends to rotate the nose-piece 6 back into a closer position of axial coincidence with the collet 3 and shank 1; viz., to a position where the center line C'L' coincides with the center line C—L.

Furthermore, such pressure would at all times be transmitted through a surface-to-surface contact, namely, through the spherical surfaces 10 and 11, and not through a mere point-to-point or linear contact. The nose-piece bearing ring 8 acts as a floating shoe which at all times makes proper contact with the spherical bearing surface 11 of the collet bearing ring 12.

The presence of the surface-to-surface bearing contact in the collet chuck embodying our invention will be seen to be of unusual advantage when considered from the standpoint of the frictional forces involved. First of all, frictional resistance varies in direct proportion to the force or pressure per unit area with which the bearing surfaces or elements are forced together. In the case of a chuck, the force exerted by a threaded nose-piece against the collet for compressing the latter is indeed very large. For example, if a force of fifty pounds is exerted upon the end of a wrench one foot long to tighten the nose-piece on a chuck in which the nose-piece threads have a pitch of $\frac{1}{16}$ of an inch (or .0052 ft.), then the resultant force of compression exerted by the nose-piece on the collet equals $$\frac{50 \times 2\pi}{.0052}$$

or on the order of 60,000 lbs. This total pressure, divided by the contact area of the bearing surface, will give the pressure per unit area transmitted through the bearing. Manifestly, the surface-to-surface contact of the bearing transmitting this pressure results in a greatly decreased pressure per unit area than in the case of linear or point-to-point bearing surface contact. This in turn greatly decreases the frictional resistance of the bearing elements with respect to each other, not only permitting the nose-piece 6 and bearing rings 11 and 12 to seek proper or uncocked alignment with respect to the collet 3, but also reducing the amount of torsional force or twist that can be transmitted from the nose-piece as it is tightened to the collet.

When it is considered that such relatively large compressive forces are transmitted from the nose-piece to the collet, the surface-to-surface bearing contact provided by our invention has the still further advantage in that it eliminates the tendency of one contacting element to form a depression, or "dig into" the other element as would be likely to be the case in a point-to-point or linear bearing contact.

Thus, even though the screw thread 7 might be slightly inaccurate, or even though the nose-piece 6 might so engage them as to cause a slight misalignment between the nose-piece and the shank of the chuck, any such error is compensated for and eliminated through the medium of the spherical bearing surfaces located between the nose-piece and the tool gripping element or collet 3.

Our above-described invention renders possible the achievement of an unusually high degree of precision and accuracy in the tool gripping action of the chuck. Thus, for example, a $5/64$ inch diameter drill, held in a chuck embodying the principle of our invention, shows only .0005 of an inch "run out" (non-conformity to true circumferential path of rotation) at a point two inches outward from the outer or left-hand end of the collet 3.

Other modes of applying the principle of the invention may be employed, change being made as regards the details described, provided the features stated in any of the following claims or the equivalent of such be employed.

We therefore particularly point out and distinctly claim as our invention:

1. In a chuck, a collet, a shank carrying said collet, a nosepiece mounted on said shank and surrounding the outer end of said collet, said nosepiece being movable toward said shank and having a radial flange overlapping the outer end of said collet, a pair of ring members mounted contiguously to each other between said flange and the end of said collet, said ring members having bearing surfaces contacting one end of said collet and said flange, and having abutting spherical surfaces whose centers are located on the axis of said chuck, said spherical surfaces and said bearing surfaces being adapted to absorb and prevent the transmission of twisting force from said nosepiece to said collet.

2. In a chuck, a collet, a shank carrying said collet, a nosepiece threadably engaging said shank and surrounding the outer end of said collet, said nosepiece being movable toward said shank and having a radial flange overlapping the outer end of said collet, a pair of ring members mounted contiguously to each other, said ring members being located between one end of said collet and said nosepiece flange and having abutting spherical surfaces whose centers are located on the axis of said chuck, one of said ring members having a flat, radial face, said flat face slidably contacting with said nosepiece, and the other of said ring members having a radially inclined flat face adapted to contact the outer end of said collet.

MILTON L. BENJAMIN.
CHARLES E. DREW.